Feb. 27, 1934.  R. D. EVANS ET AL  1,948,750
REGULATING SYSTEM
Filed May 11, 1933   2 Sheets-Sheet 1
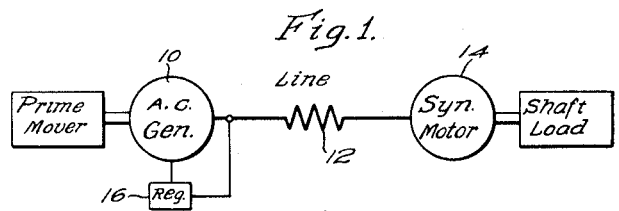
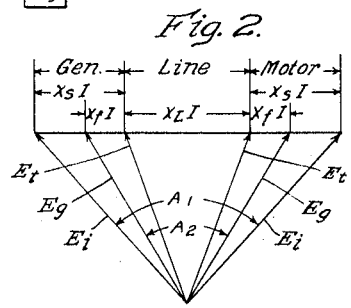
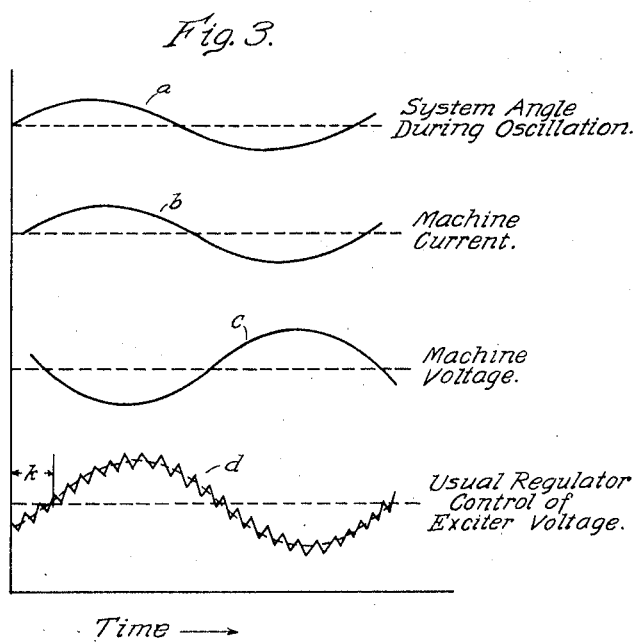
INVENTORS.
Robert D. Evans &
Homer C. Nycum.
BY Franklin E. Hardy
ATTORNEY Feb. 27, 1934.   R. D. EVANS ET AL   1,948,750
REGULATING SYSTEM
Filed May 11, 1933   2 Sheets-Sheet 2

WITNESSES:
CJ Weller
CF Bryant

INVENTORS.
Robert D. Evans &
Homer C. Nycum.
BY
Franklin E. Hardy
ATTORNEY

Patented Feb. 27, 1934

1,948,750

UNITED STATES PATENT OFFICE 1,948,750

REGULATING SYSTEM

Robert D. Evans, Swissvale, and Homer C. Nycum, Wilkinsburg, Pa., assignors to Westinghouse Electric & Manufacturing Company, East Pittsburgh, Pa., a corporation of Pennsylvania Application May 11, 1933. Serial No. 670,484

8 Claims. (Cl. 172—237)

Our invention relates to automatic regulators utilized with electrical power systems involving interconnected synchronous machines, and it has particular relation to means for causing such regulators to suppress angular oscillation when the system is being operated within the range of artificial stability.

In present-day long-distance power-transmission systems, the majority of which involve alternating-current machines, of the synchronous type, connected through circuits of considerable reactance, the determination of the load which may be carried depends to a considerable extent upon the stability characteristics of the system. In an alternating-current electrical system, power flows principally by reason of a phase difference between the rotors of the synchronous machines at the sending and receiving ends, or what amounts substantially to the same thing, a phase difference in the internal or generated electromotive forces of the machines at the opposite ends of the line, one characteristic of such a system being that the power flow varies as a sine function of this angular displacement. It is thus a familiar fact that, when a synchronous motor is supplied with power from a synchronous generator either from a common bus or through an intervening reactance, there is a definite maximum power which can be transmitted at the normal voltage under steady field conditions. Beyond this limit, generally referred to as the steady state or "static" power limit, the machines "break apart" and fall out of synchronism. It is also true, however, that considerably more power can be transmitted by the same machines over the same circuits provided that the field excitation of the machines, instead of being held steady, is properly varied in accordance with the demands from moment to moment. It has been shown that, under this condition, the machines are at each moment either actually drifting further apart in phase angle with a consequent drop in voltage or nearer together in phase angle with a consequent rise in voltage. Although in such a condition the system is inherently unstable, with proper control of the impressed excitation voltage "artificial" stability can be maintained and the maximum power may thereby be increased.

Such stable operation beyond the steady state limit is attainable, as is known, when the machine excitation is controlled by an automatic voltage regulator having proper characteristics. It is to the provision of means for obtaining improved or specially compensated characteristics in regulators adapted for this service that our invention is primarily directed.

As is pointed out in U. S. Patent No. 1,692,495, issued November 20, 1928, to R. D. Evans et al., and assigned to the Westinghouse Electric & Manufacturing Company, the theory of artificial stability essentially depends upon the use of transient reactance of the machines instead of synchronous reactance for determining the stability limits. If no special stabilizing means are present, there is a tendency for the machines when slightly exceeding the maximum stable angle between internal voltages to increase the demagnetizing currents and thus reduce the air gap flux, which, cumulatively tends to increase the angle between machines, thus leading to pull out. As is further pointed out in that patent, with quick-acting voltage regulators available, any tendency for the machine to increase its angle tends to drop the internal voltage and bring the regulators into play for increasing the excitation. The effect of this increased excitation is to increase the internal voltage and to reduce the overall angle between the machines.

Thus without regulators the maximum angle is determined by synchronous reactance, whereas with quick-acting voltage regulators, the maximum angle is determined by a fictitious reactance intermediate synchronous reactance and transient reactance. Improvement in system power limits is thus effected with the automatic regulators by causing the system to operate within the range of artificial stability already referred to.

In the case of quick-acting automatic voltage regulators applied to system synchronous machines for maintaining the same terminal voltage, laboratory tests have conclusively demonstrated that the slowly increased or steady load limit of a given transmission circuit may be raised from 100% with fixed excitation to 125% or 150% with automatic voltage control. Similar tests show that if the reactance of the machine interconnected circuit is made to substantially approach zero, the pull-out power limit under steady-state conditions may be increased from 100% to 300% or 400%. These results are more fully discussed by C. F. Wagner and R. E. Evans in a paper dealing with artificial stability which appears in the February, 1926 issue of the A. I. E. E. Transactions, and in certain supplemental remarks by the same individuals recorded on page 93 of the same volume.

When machines are operating above the static power limit, they are continually in the incipient stage of breakdown, as before pointed out. As they begin to break from synchronism, the terminal voltage changes are small, but if the small changes of terminal voltage are not corrected, the machines soon obtain sufficient velocity of oscillation to make it difficult to restore them to equilibrium at a later instant, regardless of the speed of build up of the excitation voltage. Consequently, any delay in the regulator response to these voltage changes at this time has a vital effect upon the performance of the system. As will be more completely pointed out, the improved regulator of our invention is capable of compensating for such delays in a manner that the angular changes may be effectively anticipated.

The major requirement for artificial stability is that the voltage generator shall not accumulate such oscillations as may occur. It is known that transmission systems comprising synchronous machines are ordinarily oscillatory, that is, when the shaft loads are suddenly changed, the system does not arrive at its final equilibrium at once, but only after an oscillation. Once such an oscillation begins, it may be either accumulated or damped out depending upon the time phase characteristics of the regulator and excitation system. In the regulator of our invention, as will be more completely explained, these time phase relations are such that the oscillations will tend to be effectively damped out.

An analysis has shown that, upon the occurrence of a system oscillation, regulators possessing the usual quick-response characteristics are incapable of effecting excitation corrections which are in phase with or which instantaneously follow the changes in system angle which necessitated them. In other words, there is, due to the sluggishness with which changes of the machine flux proceed, a time lag between system variations set up by an oscillation and the usual regulator adjustment of machine excitation. Because of this time lag, the excitation corrections are less effective in damping out the oscillations and in maintaining system stability than would be the case were the regulator action to proceed simultaneously with the angular changes or in anticipation thereof. This delay in response, of course, restricts the artificial stability power limits of the system. Our invention is specifically directed to means for overcoming the above-pointed out deficiencies in automatic voltage regulators and for attaining other advantages and results to be particularized hereinafter.

Generally stated, it is an object of our invention to increase the power limits of electrical circuits connecting alternating-current systems with synchronous machines.

One object of our invention is to provide automatic means for improving the stability of power systems during oscillations and other conditions which tend to cause the generator and motor ends of the transmission circuit to fall out of synchronism.

Another object of our invention is to decrease the tendency of synchronous machine systems to hunt or cumulatively build up angular oscillations, particularly when heavily loaded, as when operation in the zone of artificial stability for the system is being had.

A still further object of our invention is to provide means whereby an automatic voltage regulator utilized with a power-transmission system will respond more rapidly to increases in the system angle than to decreases to thereby cause the mean value of excitation supplied to a controlled machine during system oscillations to be raised.

In practicing our invention, we combine with automatic voltage regulators of known types special compensating means through the medium of which changes in the angular displacement of system voltage influence the regulator in a manner that increases in system angle increase the rapidity of response of the regulator above normal, while decreases in angle lower the normal response. We have discovered that through the utilization of such compensating means, the mean value of excitation supplied to a controlled machine during system oscillations is substantially raised, and that system oscillations are effectively damped out so that the maximum power limit of the system is substantially increased.

Our invention, together with additional advantages and objects thereof, will best be understood through the following description of specific embodiments when taken in conjunction with the accompanying drawings, in which:

Figure 1 is a single line diagrammatic representation of a power system to which the improved regulator of our invention is adapted;

Fig. 2 is a diagram of voltage vectors indicating certain characteristics of the system of Fig. 1;

Fig. 3 is a group of waves indicating the relationship between certain characteristics of one of the synchronous machines of the system of Fig. 1 in the necessary oscillatory motion which obtains for system operation within the zone of artificial stability;

Figure 5:
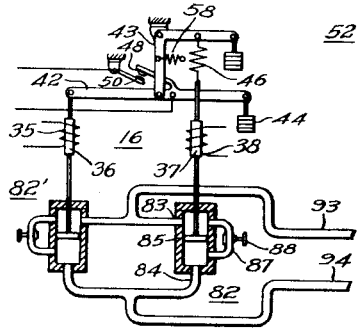
Figure 4:
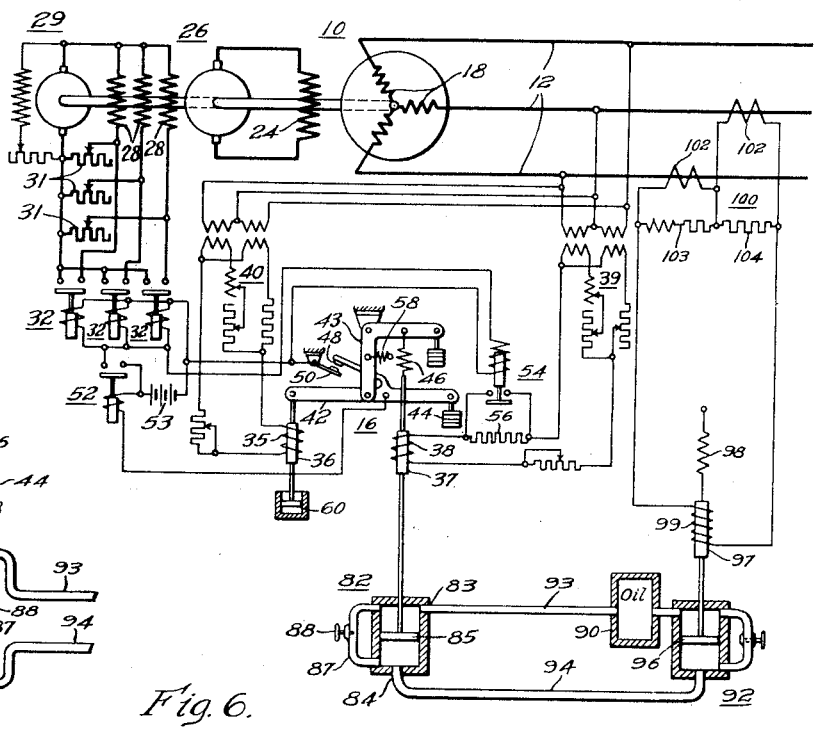
Fig. 4 is a diagrammatic view of apparatus and circuits illustrating one preferred form of our invention applied to a vibrating type regulator which controls the excitation of a synchronous generator forming a part of the power transmission system of Fig. 1.
Figure 6:
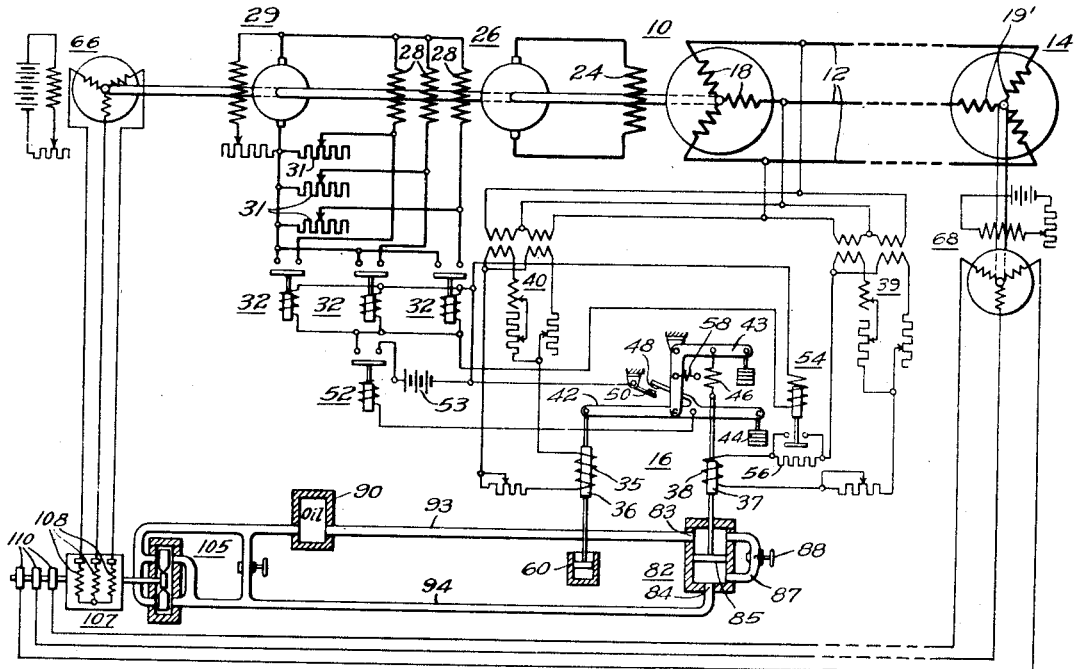

Fig. 5 is a showing of the regulator of Fig. 4 modified to the extent that both of the plunger elements thereof are provided with the special dashpots which are hydraulically actuated in response to changes in machine current; and Fig. 6 is a reproduction of the general system of Fig. 4 showing the hydraulic system for the special dashpot disposed for control by means of a motor-driven pump which is directly responsive to changes in the system phase angle.

Referring to the drawings and particularly to Fig. 1 thereof, the power system there illustrated comprises a prime mover driven alternating-current generator 10 which is connected through a line or transmission circuit 12 to a synchronous motor 14 which drives a shaft load. To control the excitation of generator 10 in a manner that the system may be operated within the range of artificial stability, an automatic regulator designated at 16 is illustrated.

The vector diagram of Fig. 2 illustrates the voltage and phase angle relations for the system of Fig. 1, when the generator 10 supplies at a terminal voltage $E_t$ a current $I$ to the motor 14. It is assumed that the line 12 possesses a reactance $X_L$ and that each of the machines has a synchronous reactance $X_s$. When the excitation of the two machines is maintained constant, as is the case when no automatic voltage regulators are used, the maximum system angle $A_1$ is determined by the synchronous reactance and, as indicated, is measured between the two internal induced voltage vectors $E_i$ of the generator and motor. However, with quick acting voltage regulators, typified by device 16 in Fig. 1, the maximum angle $A_2$ is determined by a fictitious reactance $X_f$ intermediate the synchronous reactance and transient reactance. It will be observed that the angle $A_2$, which is the one effective when the power system is being properly operated within the range of artificial stability, is measured between the internal air gap voltage vectors $E_g$ of the machines, and is considerably smaller than the constant excitation characteristic angle $A_1$. Because of this decrease in the effective system angle obtained on commercial systems through the utilization of voltage regulators which cause the machines to tend to operate on a constant voltage rather than a constant excitation characteristic, the power limits of the system are materially raised, as has been pointed out.

It has also been pointed out that for a condition of artificial stability the interconnected synchronous machines are at each moment either actually drifting further apart in phase with a consequent drop in voltage or nearer together in phase with a consequent rise in voltage. This relationship is graphically depicted in Fig. 3, in which wave $a$ illustrates the angular displacement of the system of the type shown in Fig. 1 during an oscillation; wave $b$ the resulting variations in machine current; and wave $c$ the attending fluctuations in machine voltage. Changes in machine flux requiring as they do an appreciable amount of time, the curve of machine voltage $c$ substantially lags behind the system angle curve $a$ as shown, the machine voltage being an integration of machine flux and current. Because of this slowness of flux change, the current curve $b$ also lags the angle curve $a$, though to a lesser decrease than does curve $c$. It will be understood that, particularly at times of system disturbances, the oscillations may not be periodic, as roughly indicated at Fig. 3, and further that the magnitude of variations will normally be less than shown.

It can be shown that the ideal excitation system for artificial stability operation is one which will supply voltage to the machine field winding which is in time phase with and proportional to the changes in the power system phase angle during oscillation. Unfortunately, however, the usual regulator control of exciter voltage which has been utilized in the past does not provide this desired time phase relation, but instead effects an exciter voltage adjustment which, for the reasons stated above and because of delays in regulator response, substantially lags the variation in the power system phase angle in the manner indicated by curve $d$ of Fig. 3. In practice, the magnitude of this lag may be of some value such as is indicated by $k$ in Fig. 3.

To overcome the objection just described, we contemplate the provision with known regulators of the conventional vibrating type of the beforementioned compensating element, one preferred form of which is illustrated in Fig. 4. The power transmission system shown in Fig. 4 is a more detailed reproduction of the sending end only of the complete system shown in Fig. 1, it comprising an alternating-current generator 10 illustrated as having three phase armature windings 18 directly connected with transmission circuit conductors 12, and a field winding 24.

The field winding 24 of machine 10 is energized by means of an exciter 26 shown as being provided with a multi-section field winding 28 which in turn derives its energization from a pilot exciter 29. In the energizing circuits of field sections 28 are disposed resistors 31 which are arranged to be short circuited upon the actuation of shunting relays 32.

The excitation of machine 10 is controlled by means of an automatic voltage regulator 16 which is illustrated as being of a well known vibrating type. As shown, the regulator comprises a main control winding 35 energized by the machine voltage through a positive phase sequence network 40 and a vibrating element winding 38 similarly energized through a network connection 39. Networks 40 and 39 are each for the purpose of supplying to the regulator windings a single phase voltage which at all times is proportional to the positive phase sequence component of the three single phase voltages acting in the three-phase circuit 12. Such networks, which are well known in the art, are more completely shown and described in U. S. Patent No. 1,571,224, granted February 2, 1926, to C. T. Allcutt, and assigned to the Westinghouse Electric and Manufacturing Company.

The main control winding 35 of the regulator is disposed to exert an upwardly acting pull upon a plunger member 36 which is linked to one end of a bar member 42 suspended at its center from the lower end of a bell crank lever 43 and carrying at its opposite end a counter-balancing weight 44. Suspended from the horizontal portion of bell crank 43 by means of a spring 46 is a plunger 37 upon which the vibrating element winding 38 exerts an upwardly acting force. Carried by the bar member 42 is a contact member 48 which is disposed to engage a stationary contact member 50 in order to complete an energizing circuit for a master relay 52, a battery 53 being shown as the source of energization of this circuit. Relay 52 in turn controls the actuation of resistor shunting relays 32 before-mentioned and also that of a vibrating relay 54 which is disposed upon actuation to short circuit a resistor 56 and thereby lower the impedance of the energizing circuit for vibrating element winding 38 of the regulator 16.

Regulator 16 just described possesses the characteristic, common to all vibrating contact type regulators, that the amount of excitation supplied to machine 10 is controlled by periodically short circuiting resistors 31 in the excitation circuit. When the contacts 48—50 of the regulator are closed all of the time, maximum voltage is obtained at the terminals of exciter 26, and when opened all of the time, minimum voltage is obtained. By varying the ratio of the time that the regulator contacts are closed to the time that they are opened, any value of average excitation voltage between these limits can be obtained.

In operation of the regulator 16, engagement of the two contact members 48 and 50 effects the actuation of master relay 52, which in turn causes actuation of relay 54 to short circuit resistor 56 and thereby raise the voltage impressed upon vibrating control winding 38. The resulting increase in upward pull exerted by this winding upon the plunger element 37 which is suspended from bell crank 43, allows tension spring 58 to rotate the bell crank in a counter-clockwise direction, thereby moving contact member 48 to the right and out of engagement with member 50. This interruption of the actuating circuit for relay 52 effects the opening of both relays 52 and 54, thereby lowering the voltage impressed upon control winding 38 to its original value. The decrease in upward pull on the associated plunger member rotates bell crank member 43 in a clockwise direction, thereby moving contact member 48 to the left to reestablish its engagement with member 50.

As a consequence, the contact members are again caused to separate in the manner just described, and a continuous vibration thereof is caused to be effected, the frequency being of the order of several times per second. The elevational position of the horizontally oscillating contact member 48 is determined by the magnitude of the voltage of machine 10 which, as pointed out, acts upon main control winding 35 of the regulator. An increase in voltage moves the contact member to a higher position and a decrease in voltage allows it to be lowered into closer proximity to the stationary contact member 50. Such a change in elevational position thus acts to vary the ratio of the time that the contacts are closed to the time that they are open, a lowering of the generator voltage increasing the value of this ratio, and a raising thereof decreasing the time closed to the time open ratio value. To stabilize the movements of the movable members of the regulator a suitable dashpot 60 may be associated therewith in the manner shown.

The master relay 52, following, in the manner explained, the opening and closing actions of the regulator contact members, in addition to controlling the vibrating relay 54, also controls the operation of the resistor shunting relays 32, in the excitation circuit, by periodically establishing and interrupting actuating circuits for these relays. Consequently, when the voltage of regulated machine 10 drops, relays 32 are caused in their vibrating action to increase the ratio of the time that the resistors 31 are short circuited to the time that they are active in the exciter circuit with the result that the voltage of exciter 26 is raised and the excitation of machine 10 appropriately increased. In a similar manner, a rise in the voltage of the regulated machine 10 acts to lower the ratio of the time that resistors 31 are short circuited to the time that they are active in the excitation circuit, with the result that the exciter voltage is appropriately lowered.

Preferably, the relays utilized by the regulating system are of the quick acting type, in order that the vibrations of the regulator contacts may be transmitted to the excitation circuit without undue time delay. For a similar reason, the excitation circuit itself is preferably one having a low time constant, the expedient illustrated to attain this end being the sectionalization of the main field winding 28. In spite of these precautions, however, there is still an appreciable time lag in conventional regulators to the response thereof to changes of system angle, as has been explained by curves $a$ to $d$ in Fig. 3. To compensate for this delay, we contemplate in the embodiment of our invention illustrated in Fig. 4 the provision of a special hydraulic dashpot 82 for regulator 16 to replace the simple dashpot usually associated with the vibrating plunger element 37. The device 82 is provided with conduit connections 83 and 84 at the top and bottom thereof through which fluid may be passed to impart a dynamic influence to the element 85, which is connected to the plunger 37 of the regulator. The device 82 is further provided with the usual by-pass path 87 in which a damping characteristic adjustment needle valve 88 may be inserted.

A fluid system comprising a fluid reservoir 90 and a pump device 92 is connected with the special dashpot 82 through fluid conduits 93 and 94. The piston 96 of the pump 92 is actuated upwardly, assisting the pull of a spring 98, upon energization of winding 99. This winding is supplied with an energizing current proportional to the load current of machine 10 by means of a current network 100 which comprises a pair of current transformers 102 in two of the conductors of the transmission circuit 12 and impedances 103 and 104 having inductive and resistive characteristics, respectively.

The network 100, which is for the purpose of supplying to the winding 99 a current proportional to the currents in all three of conductors 12, is more completely described in the beforementioned Allcutt Patent No. 1,571,224. Such a network will develop a single-phase current which is proportional either to the positive phase sequence current or to the negative-phase sequence current, according to the order of the terminal connections.

It is a recognized fact that the power system angular variations are accompanied by comparable changes in the magnitude of the system current, as has been explained in connection with curves $a$ and $b$ of Fig. 3. Consequently, upon operation of the system in Fig. 4 an increase in system angle effects a proportional increase in the energization of winding 99 which, by imparting an upward movement to plunger 97, causes pump device 92 to withdraw fluid from below the piston 85 of dashpot 82 and inject more into the region above the piston. This action produces a downward movement of piston 85, which causes the contact member 48 of the regulator 16 to be moved to the left or near to the contact member 50, thereby effecting an appreciable increase in the rate of excitation raising. This increase tends to retard the increase in system angle and restore it to a smaller value.

In a similar manner, a decrease in power system angle by effecting, through a lowering of machine current, a downward movement of the piston 96 of pump device 92 causes piston 85 of dashpot device 82 to be raised which moves the contact member 48 of the regulator to the right, and causes the excitation of machine 10 to be prematurely reduced.

It is apparent that in the system of Fig. 4 each given magnitude of machine current corresponds to a definite position of the piston 96 of the pump device 92; an increase in current causing the piston to move upwardly and a decrease in current allowing the piston to move downwardly to a lower position. Changes in the magnitude of machine current are, therefore, necessary before the compensating means become effective to modify the normal action of regulator 16.

It having been seen that increases in the system angle compensate the regulator in a manner to increase its rapidity of response and decreases in system angle similarly cause the regulator to delay its response, the compensating means of our invention, in effect, tend to correct the timephase displacement between the system angle curve $c$ and regulator control of exciter voltage curve $d$ depicted in Fig. 3, and otherwise render the excitation system much more effective in maintaining system stability. Loss of synchronism being a direct result of the system angle advancing to an excessive value before a corrective adjustment of excitation can be effected, the important period of regulator response is, therefore, the one in which it is called upon to raise the machine excitation to restrain the system angle. It is during this most important period that the compensating means of our invention function, in the manner explained, to accelerate this response increase.

In some cases, it may be desirable to also equip the main control element of the regulator with a special dashpot device, as is indicated at 82' in Fig. 5. The operation of this device is essentially the same as that explained in connection with Fig. 4 with the exception that the compensating action functions not only to move to the left contact member 48 upon an increase of system angle, but also to lower the position of this member because of a similar downward thrust by the device 82' upon the plunger 36 of the main control element of the regulator. A decrease in power system angle simultaneously tends to raise the main control and vibrating elements of the regulator, and thereby prematurely separates the contact members thereof.

In the event that it is desired to make the hydraulic compensating means of our invention described in connection with Figs. 4 and 5 actuable directly in response to changes in system phase angle, the equipment shown in Fig. 6 may be utilized. In Fig. 6, it will be observed that the armature windings 19' of the synchronous motor 14 at the end of the line 12 have also been illustrated in addition to the alternating-current generator 10 and its associated excitation and regulating equipment.

In the system of Fig. 6, the pump device corresponding to device 92 of Fig. 4 is in the form of a rotary mechanism 105 and is disposed to be driven by an alternating-current motor 107, the stator windings 108 of which are energized by a pilot generator 66 associated with main synchronous generator 10, while the rotor windings are energized through slip rings 110 by a pilot generator 68 associated with synchronous motor 14 at the opposite ends of the transmission circuit 12.

These pilot generators are preferably of a similar number of phases as the main machines, so that they may supply alternating-current voltages comparable to the internal induced voltages of the main machines. By appropriately setting the pilot generator rotors with respect to those of the main machines with which they are associated, the pump driving means 107 may be influenced by a potential which varies in direct accordance with changes in the power system angular displacement. In fact, these settings may be such that at some particular value of system load the current supplied to device 107 will be zero.

An increase in the system phase angle by increasing the displacement between the voltages supplied by pilot generators 66 and 68 causes the motor 107 to rotate the pump device 105 in a direction to withdraw fluid from below piston 85 of the device 82 and inject fluid into the region above the piston. This causes a movement to the left of contact member 48 of regulator 16, which, as has been explained, causes the excitation of machine 10 to be built up with premature rapidity. In a similar manner, a decrease in the system phase angle causes motor 107 to drive pump 105 in the reverse direction, which causes contact member 48 of the regulator to be moved to the right and thereby allows the excitation of machine 10 to be lowered.

With commercial machines operating at loads slightly in excess of the stability with fixed excitation, the process of pulling out of stability may be quite slow. In practice it is found that the period of time available for readjusting excitation or other equivalent control under the above-stated conditions is long enough for an operator to recognize the condition and to manually adjust rheostats to change the excitation in the required direction. Hence, it will be seen that there is ample time for automatic stability improvement means of the type described hereinbefore to act, particularly in the most frequently encountered cases in which the system angle corresponding to transient reactance is somewhat below 90 electrical degrees.

Although we have shown and described certain specific embodiments of our invention, we are fully aware that many modifications thereof are possible. Our invention, therefore, is not to be restricted except insofar as is necessitated by the prior art and by the scope of the appended claims.

We claim as our invention:

1. In combination with an alternating-current transmission system comprising a power circuit, a synchronous machine connected thereto, and an automatic voltage regulator for controlling the excitation of the machine, means for causing the regulator to increase the machine excitation at a rate which is higher than normal when the phase angle between the power voltages at separated points in said system increases in magnitude and at a rate which is lower than normal when the magnitude of said phase angle decreases.

2. In combination with an alternating-current transmission system comprising a power circuit, a synchronous machine connected thereto, and an automatic voltage regulator for controlling the excitation of the machine, means for causing the regulator to increase the machine excitation at a rate which is higher than normal when the phase angle between the power voltages at separated points in said system increases in magnitude and at a rate which is lower than normal when the magnitude of said phase angle decreases, said means causing the regulator to increase the machine excitation at the maximum rate of which it is capable when the said system angle increases at a predeterminedly excessive rate.

3. In combination with a synchronous-synchronous transmission system comprising a power circuit, an alternating current dynamo-electric machine connected thereto, and an automatic voltage regulator for controlling the excitation of the machine, means for increasing the stability and power limits of said system comprising a hydraulic device operatively connected with the regulator, and means for influencing said device by a control force which varies in accordance with changes in the phase angle between the power voltages acting at separated points in said transmission system, said hydraulic device thus acting to modify the normal voltage-change-responsive action of the regulator in a manner that increases in the magnitude of said system angle cause the regulator to increase the machine excitation at a rate above normal and decreases in angle result in slower excitation reductions.

4. In an alternating-current power-transmission system, the combination with an automatic regulator disposed to control the excitation of a synchronous machine comprised by the system, of means for increasing the power limits of said system when operated within the range of artificial stability comprising a hydraulic device operatively connected with the regulator to modify its normal action, a fluid system including said device and a pump element disposed to circulate fluid through the device, and means for actuating said pump element in accordance with changes in the phase angle between the voltages acting at separated points in said power system.

5. In an alternating-current power-transmission system, the combination with an automatic regulator disposed to control the excitation of a synchronous machine comprised by the system, of means for increasing the power limits of said system when operated within the range of artificial stability comprising a hydraulic device operatively connected with the regulator to modify its normal action, a fluid system including said device and a pump element disposed to circulate fluid through the device, and means for actuating said pump element in accordance with changes in the phase angle between the voltages acting at separated points in said power system, said means comprising motive means connected with the pump element and energized by the current of the synchronous machine.

6. The combination with a transmission system comprising a power circuit having a synchronous machine connected thereto, and an automatic voltage regulator disposed to control the excitation of said machine, of a hydraulic device operatively connected with the regulator, a fluid system including said device and a pump element disposed to circulate actuating fluid through the system, and motive means connected with the pump element and energized by the current of the synchronous machine, the resulting actuation of said hydraulic device being such as to cause the regulator to increase the machine excitation at a rate which is higher than normal when the phase angle between the power voltages acting at separated points in said system increases in magnitude and at a rate which is lower than normal when the magnitude of the said phase angle decreases.

7. The combination with a transmission system comprising an alternating-current power circuit having a synchronous machine connected to each end thereof, a voltage regulator disposed to control the excitation of one of said machines, a hydraulic device operatively connected with the regulator to modify its normal action, a fluid system including said device and a pump element disposed to circulate actuating fluid through the system, and means for actuating said pump element in accordance with changes in the phase angle between the power voltages of said two machines, said means comprising an alternating-current pilot generator driven by each of said two synchronous machines, motive means connected with the pump element, and circuits for impressing upon said motive means both of said pilot generator voltages.

8. The combination with a transmission system comprising an alternating-current power circuit having a synchronous machine connected to each end thereof, a voltage regulator disposed to control the excitation of one of said machines, a hydraulic device operatively connected with the regulator to modify its normal action, a fluid system including said device and a pump element disposed to circulate actuating fluid through the system, an alternating-current pilot generator driven by each of said two synchronous machines, motive means connected with the pump element, and circuits for impressing upon said motive means both of said pilot generator voltages, the resulting actuation of said hydraulic device being such as to cause the regulator to increase the machine excitation at a rate which is higher than normal when the phase angle between the power voltages of said two machines increases in magnitude and at a rate which is lower than normal when the magnitude of the said phase angle decreases.

ROBERT D. EVANS.
HOMER C. NYCUM.